(12) United States Patent
Hallihan

(10) Patent No.: US 7,383,225 B2
(45) Date of Patent: Jun. 3, 2008

(54) MODULE FOR THE INTERCONNECTIVITY OF INDEPENDENT SOFTWARE APPLICATIONS

(75) Inventor: Daniel Hallihan, Hackensack, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 710 days.

(21) Appl. No.: 09/827,283

(22) Filed: Apr. 4, 2001

(65) Prior Publication Data

US 2001/0047316 A1 Nov. 29, 2001

Related U.S. Application Data

(60) Provisional application No. 60/194,377, filed on Apr. 4, 2000.

(51) Int. Cl.
*G06Q 30/00* (2006.01)

(52) U.S. Cl. .................. 705/40; 705/30; 705/32; 705/39; 705/40

(58) Field of Classification Search .............. 705/30, 705/32, 39, 40; 709/229
See application file for complete search history.

(56) References Cited

U.S. PATENT DOCUMENTS

| | | | |
|---|---|---|---|
| 4,819,162 A | | 4/1989 | Webb, Jr. et al. |
| 5,459,657 A | | 10/1995 | Wynn et al. |
| 6,347,306 B1 | * | 2/2002 | Swart .................. 705/32 |
| 6,401,079 B1 | * | 6/2002 | Kahn et al. ............ 705/30 |
| 6,408,337 B1 | * | 6/2002 | Dietz et al. ........... 709/229 |
| 6,411,938 B1 | * | 6/2002 | Gates et al. ........... 705/30 |
| 6,829,588 B1 | * | 12/2004 | Stoutenburg et al. ...... 705/30 |
| 7,024,389 B1 | * | 4/2006 | Watkins ................ 705/39 |
| 7,089,200 B2 | * | 8/2006 | Bode .................... 705/32 |
| 7,225,155 B1 | * | 5/2007 | Polk ..................... 705/40 |
| 7,229,013 B2 | * | 6/2007 | Ben-Aissa .............. 235/380 |
| 2003/0197055 A1 | * | 10/2003 | Ben-Aissa .............. 235/379 |
| 2005/0109836 A1 | * | 5/2005 | Ben-Aissa .............. 235/380 |

OTHER PUBLICATIONS

"Best Software Launches Roles-Based Self-Service Functionality for Best! Imperativ Payroll", Business Wiere, May 20, 1999.*
"What your system should have.", Accounting Today, FAUL99161023, May 24, 1999.*
"Comshare Offers Payroll Interfaces", News Release, p. 1, Oct. 19, 1987.*
Barr, "Payroll Quandaries", CFO The Magazine for Senior Financial Executives, v13, n5, p. 83, May 1997.*
Rational Software Corporation, A Rational Approach to Software Development, Using Rational Rose 4.0. Publication, Nov. 1996.

* cited by examiner

*Primary Examiner*—Nga Nguyen
(74) *Attorney, Agent, or Firm*—Townsend and Townsend and Crew LLP

(57) ABSTRACT

The present invention discloses an interconnectivity program module that provides for interconnectivity and interfacing of independent application programs in the context of a data processing system. Specifically, the interconnectivity program module provides a time and expenses database and interface capability between a payroll application, an accounts payable application, and a projects/billing application.

26 Claims, 6 Drawing Sheets

MODULE FOR THE INTERCONNECTIVITY OF INDEPENDENT SOFTWARE APPLICATIONS

CROSS-REFERENCES TO RELATED APPLICATIONS

This application claims the benefit of Provisional Patent Application Ser. No. 60/194,377, filed on Apr. 4, 2000, entitled "Module For The Interconnectivity Of Independent Software Applications," which is incorporated herein by reference.

BACKGROUND OF THE INVENTION

1. Field of the Invention

The present invention relates to data processing systems, and specifically to data processing systems that interface between multiple independent software applications. In particular, the invention is a module for interfacing between at least a payroll application, an accounts payable application and a time and expense application.

2. Description of Related Art

Numerous independent programs exist for keeping track of employee time slips, payroll, accounts payable, projects, and billing. Unfortunately, these independent programs are not designed to communicate with one another and, as a result, time consuming duplicate entries of data is often required. The duplicative entry of data and the potential for erroneous data entry is unacceptable for both large companies employing a large number of full-time employees and for temporary service agencies employing many part time employees. Therefore, there exists a need in the art for a program module that interfaces between at least a payroll application, an accounts payable application, and a time and expense application.

SUMMARY OF THE INVENTION

The present invention discloses an interconnectivity program module that provides for interconnectivity and interfacing of independent application programs in the context of a data processing system. Specifically, the interconnectivity program module provides a time and expenses database and interface capability between a payroll application, an accounts payable application, and a projects/billing application.

Once data is entered into the time and expenses database of the interconnectivity program module, the data is available to a payroll processor, an accounts payable processor and a projects/billing processor. These processors run independent payroll, accounts payable and projects/billing software applications, respectively, without compromising the integrity and accuracy of the data. As a result, duplicate entries to each processor are eliminated.

The simultaneous entry of data to several processing programs in this way ensures consistent and correct data entry between applications. The present invention also allows for the prompt and accurate disbursement of payments to employees and vendors, as well as the proper and accurate billing of customers.

DESCRIPTION OF THE PREFERRED EMBODIMENT

The present invention discloses a system and method for interconnecting independent software applications. The invention is an interconnectivity software program that provides the interfacing and interconnecting of data between one or more independent applications.

Figure 1:
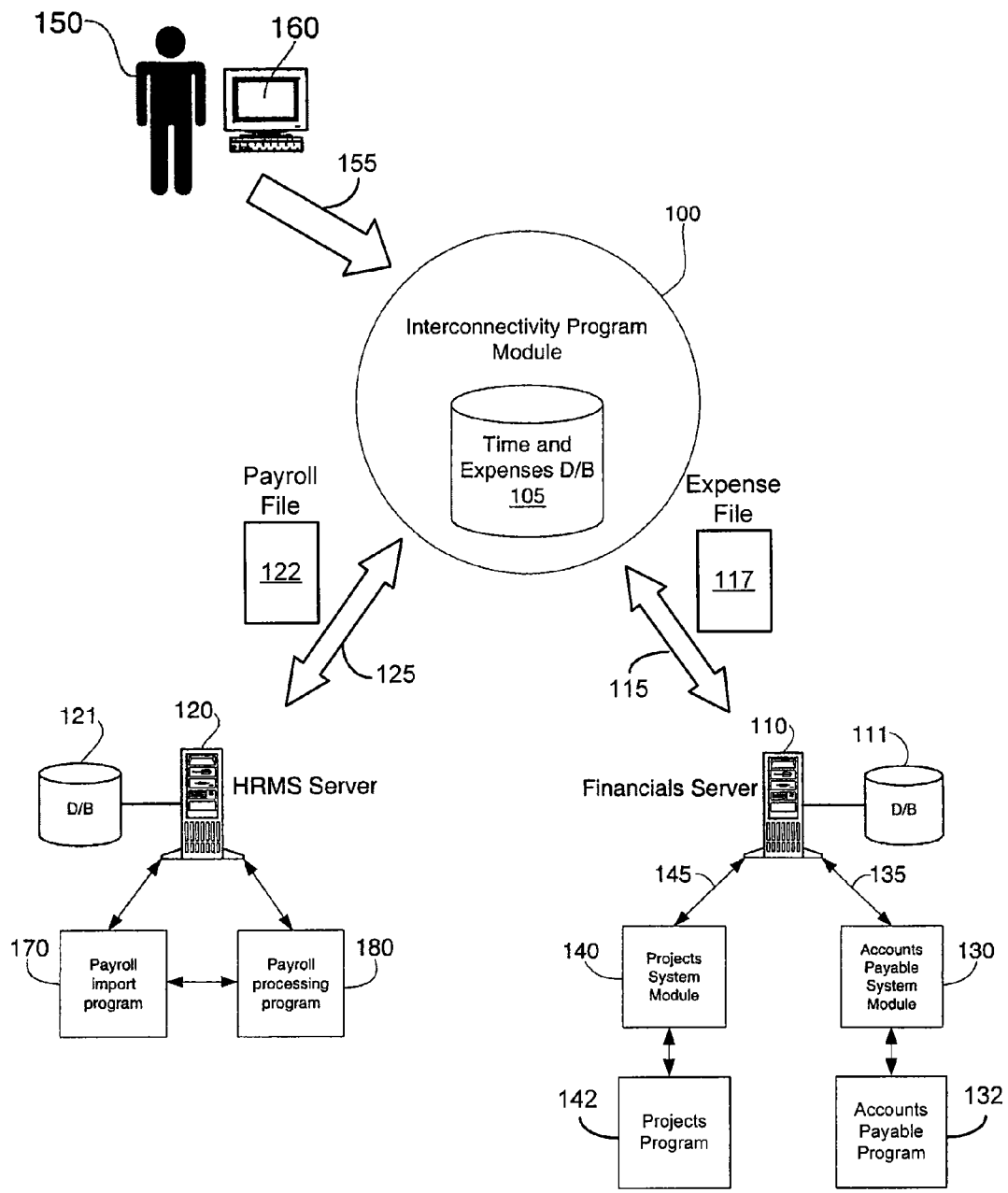
FIG. 1 is a diagram of an enterprise-wide data processing system utilizing an interconnectivity program module of the present invention.

FIG. 1 shows the architecture of a system for interconnecting various independent software applications according to the present invention. In the preferred embodiment, an interconnectivity program module 100 interfaces with a Human Resources Management System (HRMS) server 120 and a financials server 110, as shown in FIG. 1. The interconnectivity program module 100 provides communications to each of the servers by way of an HRMS interface 125 and a financials interface 115.

The purpose of each server is to run one or more independent software applications in order to process data for specific tasks. In the preferred embodiment, the financials server 110 includes an accounts payable system module 130 and a projects system module 140, both of which run independent applications, such as projects 142, billing, and accounts payable programs 132. The accounts payable system module 130 and the projects system module 140 process data provided by the financials server 110 through an accounts payable interface 135 and a projects interface 145, respectively. The HRMS server 120 also runs independent applications, such as a payroll import program 170 and a payroll-processing program 180. Thus, the system can run applications that process data for time cards, payroll, project, billing, costing and accounts payable functions. Many other independent software applications can be provided in this system, thus the present invention is not limited to the applications exemplified in FIG. 1.

Both the financials server 110 and the HRMS server 120 contain a database that is specific to the information that the particular server processes. As can be seen in FIG. 1, the HRMS server 120 uses an HRMS database 121 and the financials server 110 uses a financials database 111. As will be described below, these databases contain time and expense data used for processing according to specific requirements.

A data entry operator 150 enters data relating to various parameters, such as employee time card data and expenses, into the interconnectivity program module 100 by way of a series of rapid entry panels 160. The data is then sent through a data entry interface 155 to the interconnectivity program module 100, where it is stored in a time and expenses database 105. The data is kept in the time and expenses database 105 until needed for processing by the HRMS server 120 and/or the financials server 110.

Figure 2:
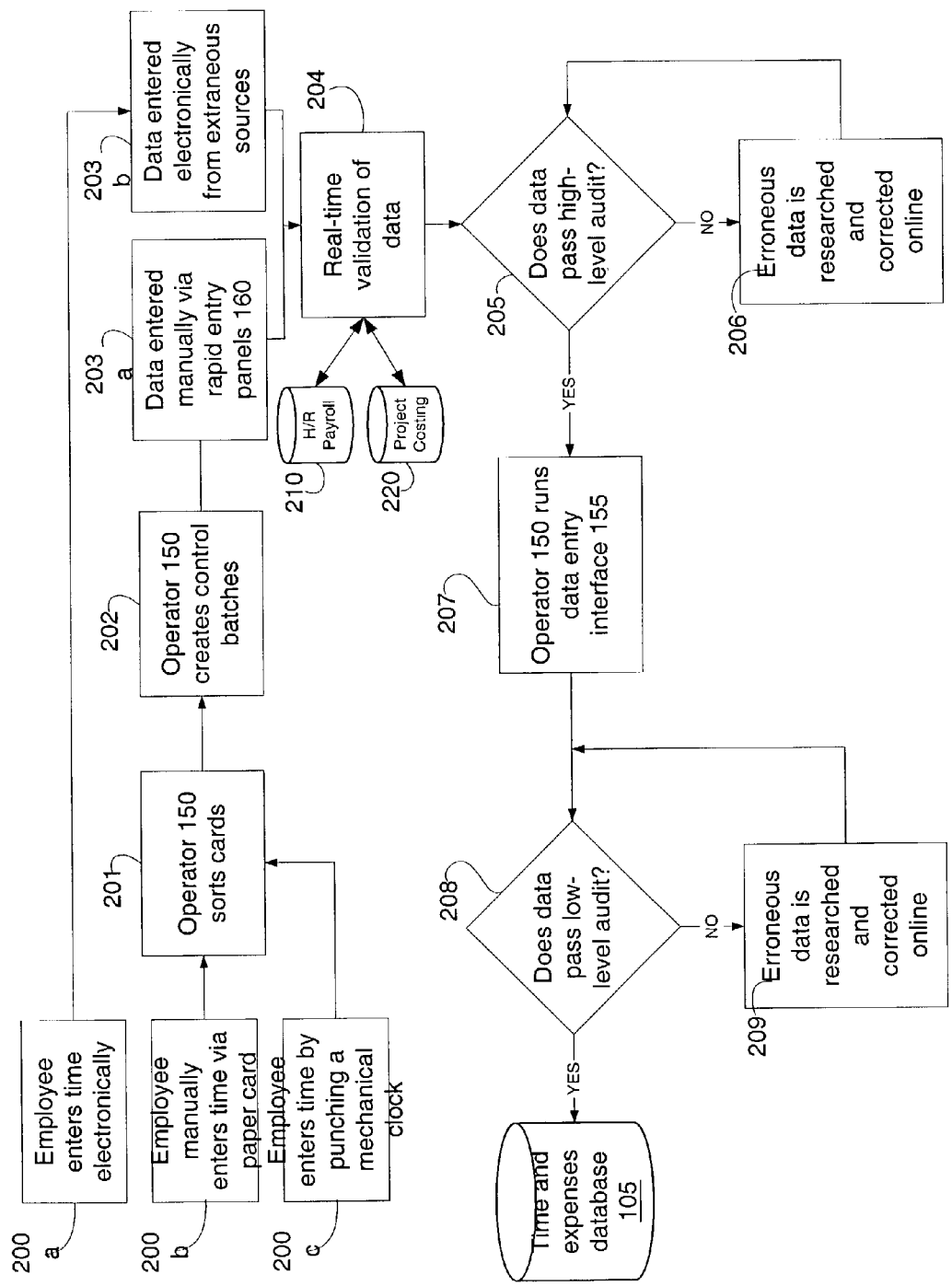
FIG. 2 shows the steps used to input time and expense data into a time and expenses database of the present invention.

FIG. 2 shows the how data is inputted to the interconnectivity program module 100 by way of the data entry interface 155 (FIG. 1). In some work environments, employees use conventional time cards to log time worked. In steps 200b and 200c, the employee enters his or her time into the system either by manually filling in the time worked on a paper time card or by punching the card with a mechanical clock. In step 201, the data entry operator 150 (FIG. 1) takes a large number of these physical time cards, sorts them by branch and type, and reviews the time card feeds. Then, in step 202, the data entry operator 150 creates control batches for entry into the interconnectivity program module 100. In step 203a, the data entry operator 150 can use the rapid entry panels 160 (FIG. 1) to manually enter both time card details and expense data. The rapid entry panels 160 provide the data entry operator 150 with a variety of templates to use for data entry. Because the interconnectivity program module 100 (FIG. 1) is capable of receiving input in a multiplicity of time and expense program formats, the rapid entry panels 160 allow the data entry operator 150 to format the outgoing data in a number of different formats that are compatible with the interconnectivity program module 100.

In other work environments, time may be entered electronically, such as through a computer or use of a time card with a magnetic stripe for swiping through a time card reader. In this case, the employee enters his or her time electronically in step 200a. Thus, the time card details and expense data are directly entered into the data processing system in step 203b without manual intervention from the data entry operator 150.

In step 204, real-time verification of the data is performed. In the preferred embodiment, the data is verified using a human resources database 210 and a projects costing database 220. The data is compared to data in the human resources database 210 and the projects costing database 220 and may be verified and edited at this step. Such information includes verifying whether the employee is in active status, verifying an employee's pay rate, verifying vacation and holiday hours, applying special overtime rules, verifying dates of employment with dates of pay, verifying employee billing rates, etc.

Step 205 determines whether or not the time and expense data entries have passed high-level audits. In the preferred embodiment, high level audits may include checking whether the hourly totals add up to an eight hour work day, whether the start and stop times are within a predefined period, and whether the employee is properly assigned to the billed job. If a particular data entry does not pass the high level audits, step 206 preferably returns the data for online correction by the data entry operator 150. The data is then sent through the high level audit in step 205 for re-evaluation. Once the data passes the high level audits, the data entry operator 150 runs the data entry interface 155 in step 207.

The data entry interface 155 performs one or more low-level data audits in step 208. Low-level data audits are specific to a job and/or customer. In the preferred embodiment, this may include audits as to mandatory lunch hours, applicable hourly pay rates for overtime, required workdays, or any other auditable criteria. If the data fails the low-level audits in step 208, step 209 allows the data entry operator 150 to review and correct the data online. The data is then sent through the low level audits of step 208 for re-evaluation. Once the data passes the low-level audits of step 208, the data entry interface 155 sends the data to the time and expenses database 105 for storage and future retrieval. The time and expense data is now available for use by the financials server 110 and the HRMS server 120 (FIG. 1).

Figure 4:
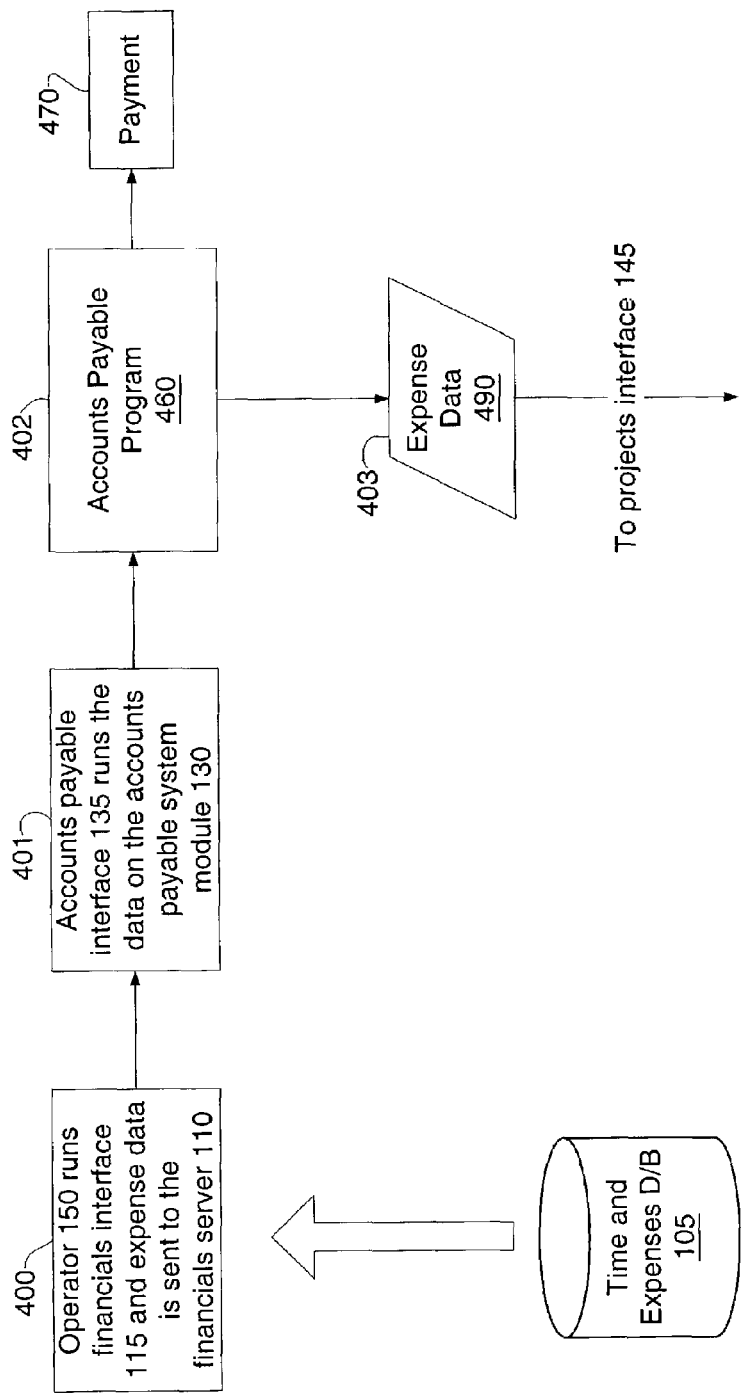
FIG. 4 shows the steps used to interconnect time and expense data from the time and expenses database of FIG. 2 to an accounts payable system.

FIG. 4 shows how the interconnectivity program module 100 (FIG. 1) uses the HRMS interface 125 (FIG. 1) to provide an interface between data in the time and expenses database 105 (FIG. 1) and applications running on the HRMS server 120 (FIG. 1). In step 300, the data entry operator 150 runs the HRMS interface 125 on payroll data stored in an retrieved from the time and expenses database 105. In step 301, the HRMS interface 125 creates files 122 from the payroll data that is compatible with the payroll import program 170 running on the HRMS server 120 (FIG. 1) and sends the converted data to the payroll import program 170. An example of the payroll import program 170 is Pay Sheets, manufactured and distributed by PeopleSoft, Inc. of Pleasanton, Calif. In step 302, the payroll import program 170 converts the files into a format that is compatible with the payroll-processing program 180, also running on the HRMS server 120 (FIG. 1), and sends the files to the payroll-processing program. In step 303, the payroll-processing program 180 confirms the payroll data and generates a check 370 or a direct deposit 380 for an employee.

In step 304, after payroll confirmation in step 303, the data processed by the payroll-processing program 180 is sent as payroll data 390 to the projects system module 140 by way of the projects interface 145 (see discussion below with respect to FIGS. 5 and 6).

FIG. 4 shows how the interconnectivity program module 100 (FIG. 1) uses the financials interface 15 (FIG. 1) to provide an interface between data in the time and expenses database 105 (FIG. 1) and applications running on the accounts payable system module 130 (FIG. 1) of the financials server 110 (FIG. 1) by way of the accounts payable interface 135 (FIG. 1). In step 400 of FIG. 4, the data entry operator 150 runs the financials interface 115 on expense data stored in and retrieved from the time and expenses database 105. The financials interface sends the expense data file 117 to the financials server 110. In step 401, the accounts payable interface 135 runs the data on the accounts payable system module 130. The accounts payable system module 130 may include an accounts payable program 460, which also resides on the financials server 110. In step 402, the data is processed by the accounts payable program 460, which generates a payment 470 for the appropriate vendor to whom the payment is owed. In step 403, the data processed by the accounts payable program 460 is sent as expense data 490 to the projects system module 140 (FIG. 1) by way of the projects interface 145 (see discussion below with respect to FIGS. 5 and 6).

Figure 5:
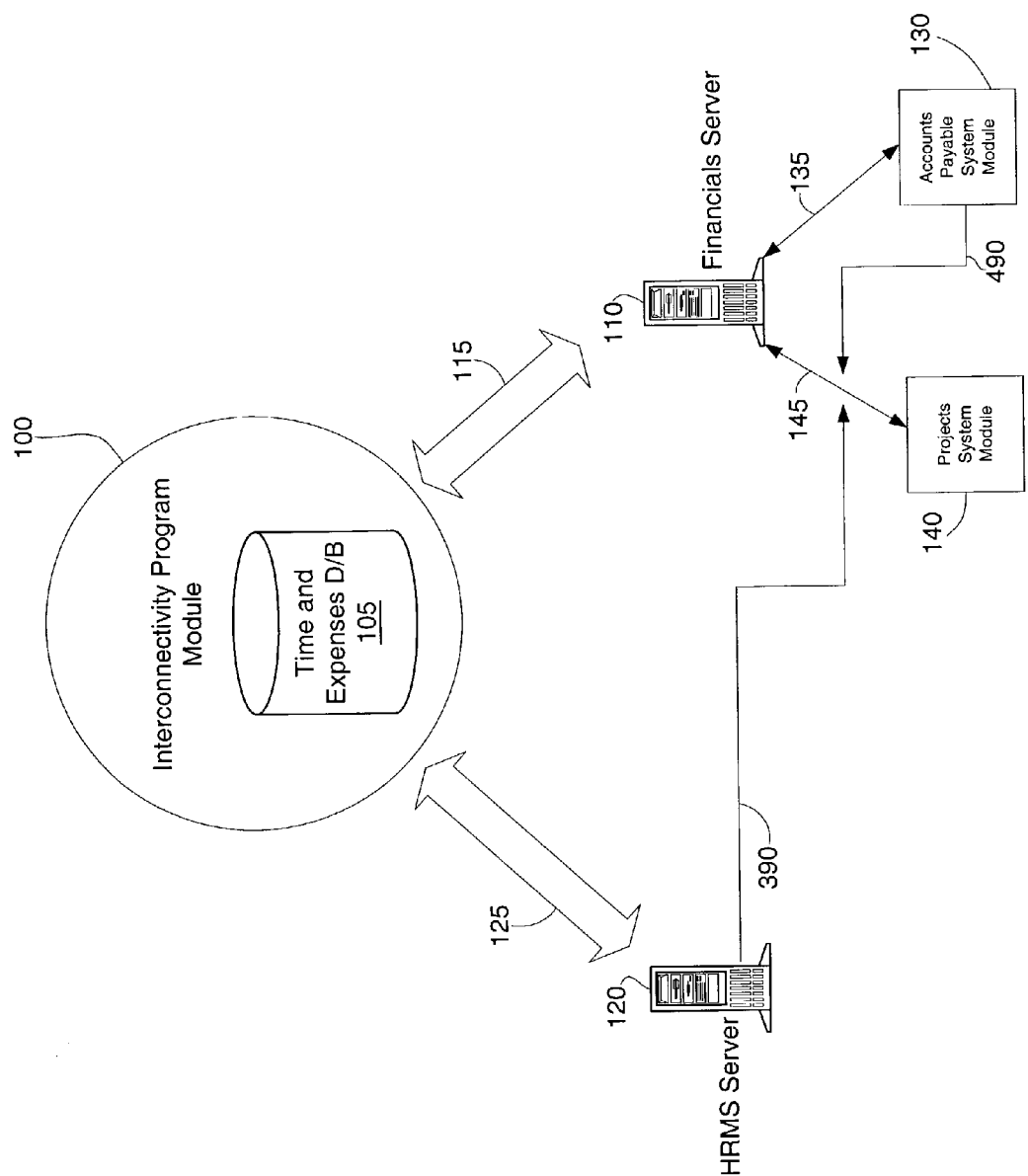
FIG. 5 shows the interconnectivity relationship between the interconnectivity program module, the payroll processor, the accounts payable processor and the projects/billing processor.

FIG. 5 shows the data processing system of FIG. 1 and how the interconnectivity program module 100 provides the interfacing of the payroll data 390 and the expense data 490 with the projects interface 145 as described above in reference to FIGS. 3 and 4. Using the present invention, the payroll data 390 and the expense data 490 is shared with the projects system module 140 after processing by the independent applications running on the financials server 110 and the HRMS server 120.

Figure 6:
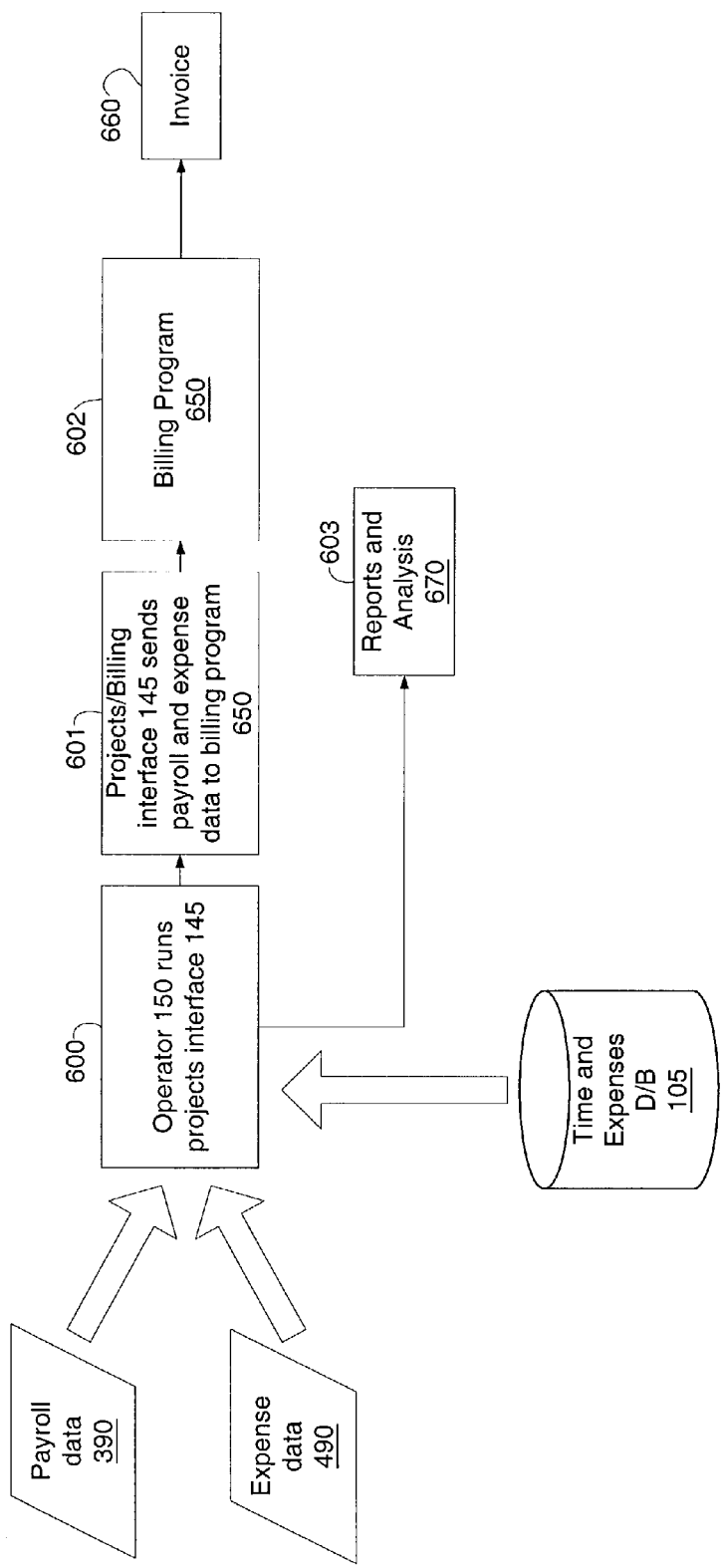
FIG. 6 shows the steps used to interconnect payroll data and expense data from the payroll processor and the accounts payable processor, respectively, to a projects/billing system.

FIG. 6 shows how data in the time and expenses database 105, the payroll data 390 and the expense data 490 interface with the projects system module 140 (FIG. 1). As discussed above, in step 304 (FIG. 3) and 403 (FIG. 4), the payroll data 390 and the expense data 490 processed by the payroll-processing program 180 (FIG. 1) and the accounts payable program 460 (FIG. 4), respectively, are sent to the projects system module 140 by way of the projects interface 145 (FIG. 1). At step 600, the data entry operator 150 runs the projects interface 145, which incorporates all payroll, labor, expenses and vendor costs into the data processing system. In step 601, the projects interface 145 sends the data to a billing program 650. In step 602, the billing program 650 picks up the appropriate transactions entered in step 600 for standard billing processing. The billing program 650 then generates an invoice 660 to customers. In step 603, the data entered from step 600 is made available to generate a report 670. There are a number of reports and analyses that can be generated, including reports that detail expenses, efficiency, etc.

Using the present invention as described above, single entries of time and expense data are made through the interconnectivity program module 100. The data is stored and used by any number of independent software applications running on the HRMS server 120 and the financials server 110, eliminating duplicate entries of the data. The single entry of data to several processing programs in this way ensures consistent and correct data entry between applications. It also ensures that employees and vendors are paid the correct amount, and that customers are billed properly and accurately.

As preferred embodiments of the present invention are described above with reference to the aforementioned drawings, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings are not be considered in a limiting sense as it is understood that the present invention is in no way limited to the embodiments illustrated.

What is claimed is:

1. A program product embedded in a computer readable medium for processing time data and expense data, the software product comprising:
    interconnectivity software operational when executed by a processor to direct the processor to:
        receive the time data into a program module,
        receive the expense data into the program module,
        store the time data received from the program module and the expense data received from the program module in a central time and expenses database, the time and expenses database being a single access point for a plurality of independent software applications;
        create a first file of a first format compatible with a payroll system, the first file including the time data from the time and expenses database, and transfer the first file to the payroll system using a first interface, the payroll system including a payroll software application configured to process the time data; and
        create a second file of a second format compatible with an accounts payable software application, the second file including the expense data from the time and expenses database, and transfer the second file to the accounts payable system using a second interface, the accounts payable system including an accounts payable software application configured to process the expense data; and
    a software storage medium operational to store the interconnectivity software.

2. The program product of claim 1 wherein the interconnectivity software is operational when executed by the processor to direct the processor to verify the time data in the program module.

3. The program product of claim 1 wherein the interconnectivity software is operational when executed by the processor to direct the processor to verify the expense data in the program module.

4. The program product of claim 1 wherein the interconnectivity software is operational when executed by the processor to direct the processor to convert the time data into a format compatible with the payroll system.

5. The method of claim 1, wherein the interconnectivity software when executed by a processor to direct the processor to:
    transfer the processed time data from the payroll system to a projects system; and
    transfer the processed expense data from the accounts payable system to the projects system, the projects system including a project application configured to process the processed time data and the processed expense data, wherein the time data flows from the single access point to the payroll system to the projects system and the expense data flows from the single access point to the accounts payable system to the projects system.

6. The method of claim 5 further comprising processing the time data and the expense data in the projects system to generate a report.

7. A method for processing time data and expense data, the method comprising:
    receiving the time data into a program module;
    receiving the expense data into the program module;
    storing the time data received from the program module and the expense data received from the program module in a central time and expenses database, the time and expenses database being a single access point for a plurality of independent software applications;
    creating a first file of a first format compatible with a payroll system, the first file including the time data from the time and expenses database, and transferring the first file to the payroll system using a first interface, the payroll system including a payroll software application configured to process the time data;
    creating a second file of a second format compatible with an accounts payable software application, the second file including the expense data from the time and expenses database, and transferring the second file to the accounts payable system using a second interface, the accounts payable system including an accounts payable software application configured to process the expense data.

8. The method of claim 7 further comprising verifying the time data in the program module.

9. The method of claim 7 further comprising verifying the expense data in the program module.

10. The method of claim 7 further comprising converting the time data into a format compatible with the payroll system.

11. The method of claim 7 further comprising generating payment in the payroll system based on the time data.

12. The method of claim 7 wherein transferring the time data comprises communicating between the program module and the payroll system.

13. The method of claim 7 wherein transferring the expense data comprises communicating between the program module and the accounts payable system.

14. The method of claim 7 further comprising generating payment in the accounts payable system based on the expense data.

15. The method of claim 7 further comprising:
transferring the processed time data from the payroll system to a projects system; and
transferring the processed expense data from the accounts payable system to the projects system, the projects system including a project application configured to process the processed time data and the processed expense data, wherein the time data flows from the single access point to the payroll system to the projects system and the expense data flows from the single access point to the accounts payable system to the projects system.

16. The method of claim 15 further comprising processing the time data and the expense data in the projects system to generate a report.

17. The method of claim 7 further comprising processing the time data and the expense data in a billing system to generate an invoice.

18. A data processing system for processing time data and expense data, the data processing system comprising:
a memory device storing a program module; and
a processor functionally coupled to the memory device, the processor being responsive to executable instructions contained in the program module and operable to:
receive the time data and the expense data, and store the time data and expense data in a central time and expenses database, the time and expenses database being a single access point for a plurality of independent software applications;
create a first file of a first format compatible with a payroll system, the first file including the time data from the central time and expenses database, and transfer the first file to the payroll system using a first interface, the payroll system including a payroll software application configured to process the time data; and
create a second file of a second format compatible with an accounts payable system, the second file including the expense data from the central time and expenses database, and transfer the second file to the accounts payable system using a second interface, the accounts payable system including an accounts payable software application configured to process the expense data.

19. The data processing system of claim 18 wherein the program module is further configured to verify the time data.

20. The data processing system of claim 18 wherein the program module is further configured to verify the expense data.

21. The data processing system of claim 18 wherein the program module is further configured to convert the time data into a format compatible with the payroll system.

22. The data processing system of claim 18 further comprising the payroll system wherein the payroll system is configured to generate payment based on the time data.

23. The data processing system of claim 18 further comprising the accounts payable system wherein the accounts payable system is configured to generate payment based on the expense data.

24. The data processing system of claim 18 further comprising a projects system configured to receive the processed time data from the payroll system and receive the processed expense data from the accounts payable system, the projects system including a project application configured to process the processed time data and the processed expense data, wherein the time data flows from the single access point to the payroll system to the projects system and the expense data flows from the single access point to the accounts payable system to the projects system.

25. The data processing system of claim 24 wherein the projects system is configured to process the time data and the expense data to generate a report.

26. The data processing system of claim 18 further comprising a billing system configured to process the time data and the expense data to generate an invoice.

* * * * *

UNITED STATES PATENT AND TRADEMARK OFFICE
CERTIFICATE OF CORRECTION

PATENT NO. : 7,383,225 B2  Page 1 of 1
APPLICATION NO. : 09/827283
DATED : June 3, 2008
INVENTOR(S) : Hallihan It is certified that error appears in the above-identified patent and that said Letters Patent is hereby corrected as shown below:

On the face page, in field (56), column 2, under "Other Publications", line 2, delete "Wiere," and insert -- Wire --, therefor.

Figure 3:
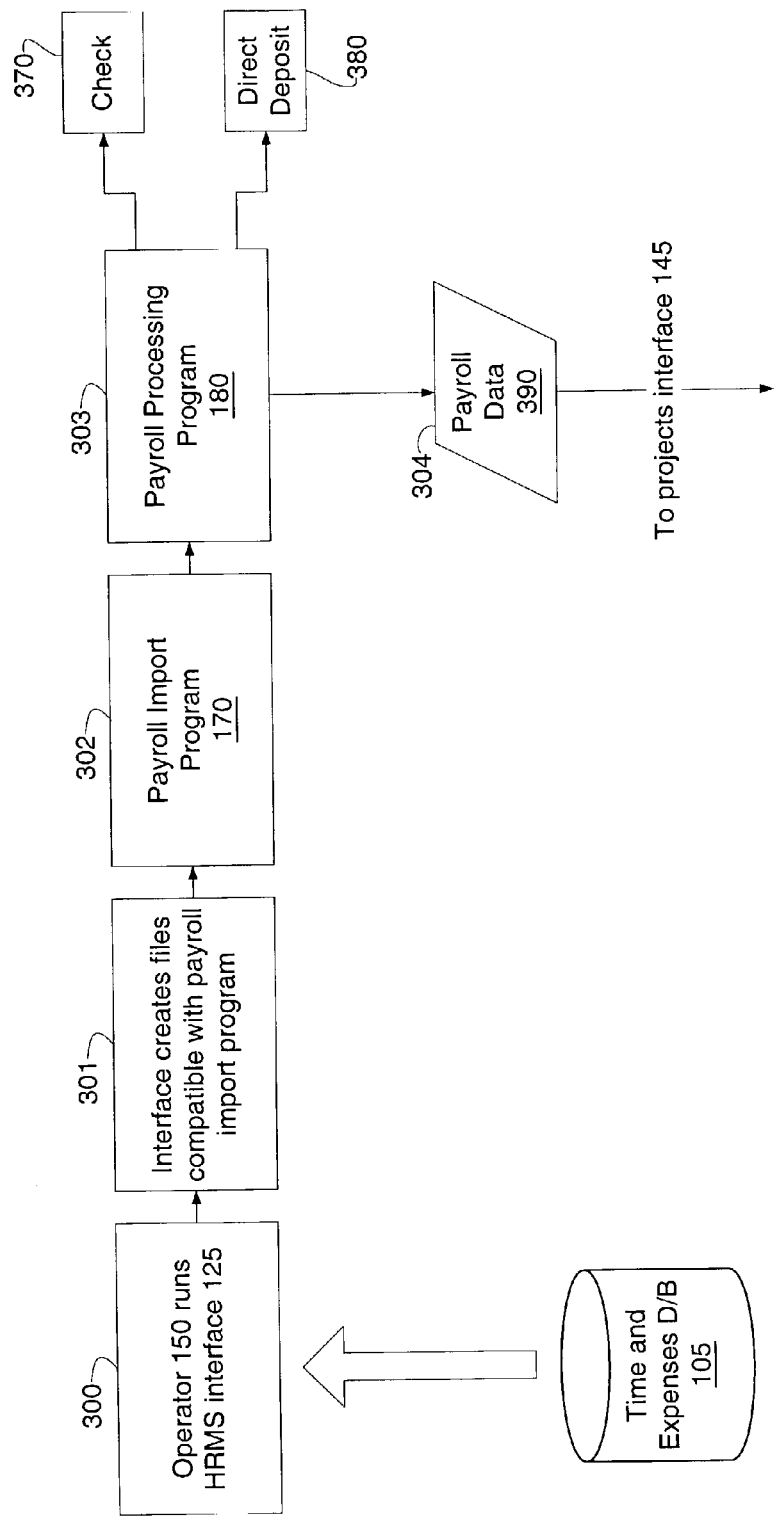
FIG. 3 shows the steps used to interconnect time and expense data from the time and expenses database of FIG. 2 to a payroll processing system.

In column 4, line 5, delete "FIG. 4" and insert -- FIG. 3 --, therefor.

In column 4, line 11, delete "an" and insert -- and --, therefor.

In column 4, line 31, delete "15" and insert -- 115 --, therefor.

In column 4, line 39, after "sends" delete "the".

Signed and Sealed this

Seventh Day of July, 2009

JOHN DOLL
*Acting Director of the United States Patent and Trademark Office*